United States Patent [19]

Sommer

[11] Patent Number: 4,676,922

[45] Date of Patent: Jun. 30, 1987

[54] PREBLENDS

[75] Inventor: John G. Sommer, Hudson, Ohio

[73] Assignee: GenCorp Inc., Akron, Ohio

[21] Appl. No.: 848,108

[22] Filed: Apr. 4, 1986

[51] Int. Cl.$^4$ .............................................. C09K 3/00
[52] U.S. Cl. .................................................. 252/182
[58] Field of Search ......................................... 252/182

[56] References Cited

U.S. PATENT DOCUMENTS

| | | | |
|---|---|---|---|
| 4,088,708 | 5/1978 | Riew | 260/836 |
| 4,240,974 | 12/1980 | Little et al. | 260/456 P |
| 4,259,468 | 3/1981 | Kajiura et al. | 526/283 |
| 4,545,927 | 10/1985 | Railsback | 252/511 |

*Primary Examiner*—Edward A. Miller

[57] ABSTRACT

Preblends of sulfur and N-cyclohexyl-2-benzothiazolesulfenamide, optionally with diphenylguanadine, can be stabilized against deterioration by incorporating with these materials at least one additive selected from the group consisting phthalic anhydride, phthalic acid and tetrahydrophthalic anhydride. Vulcanizable rubber compounds containing aged preblends with these additives exhibit reduced scorch as compared to aged preblends without said additives.

4 Claims, No Drawings

PREBLENDS

This invention relates to sulfur containing preblends for use in the curing or vulcanization of rubber.

An object of this invention is to provide a storage-stable sulfur containing preblend for use in the vulcanization of rubber.

These and other objects and advantages of the present invention will become more apparent to those skilled in the art from the following description and examples.

SUMMARY OF THE INVENTION

It has been found that sulfur (S) and N-cyclohexyl-2-benzothiazolesulfenamide (CBS, Santocure, an accelerator, Monsanto), optionally with diphenylguanidine (DPG, an accelerator), when blended together with certain retarders or anti-scorch agents like phthalic anhydride (PA), phthalic acid (PAc), tetrahydrophthalic anhydride (THPA) or mixture thereof can be stored under dry or moist conditions for extended periods of time without decomposition or causing a decrease in scorch time when compounded with an uncured rubber composition and then curing the same.

A disadvantage for curative preblends like S, CBS and DPG is that, after aging in storage, they change from a powdery material to a paste-like material. The preblend is not free flowing after aging, as it was prior to aging. Further, aged S/CBS/DPG preblends significantly reduce the scorch time of rubber compounds containing them. For example, the scorch time for a rubber compound containing an aged preblend of S/CBS/DPG decreased as shown below:

| Scorch time, min., for the following added to a rubber compound | | |
|---|---|---|
| S, CBS and DPG added separately | Preblended S/CBS/DPG aged 24 hours @ 40° C. | |
|  | Dry* | Moist** |
| 12.5 | 6.0 | 5.5 |

*28% relative humidity;
**92% relative humidity.

The use of the above retarders in preblends of S and CBS, optionally with DPG, not only reduces scorch in aged mixtures but also affords the following additional advantages:

I. significant reduction in the number of ingredient weighings,

II. greater cleanliness in the weighing area due to the reduced number of weighings, and III. improved uniformity in finished rubber compounds.

Discussion of Details

In the preblend the ingredients are used in the following amounts (parts by weight):

I. from about 0.5 to 3.0 parts of S,
II. from 0.5 to 5.0 parts of CBS,
III. additionally, optionally from 0.05 to 1.5 parts of DPG and
IV. from 0.05 to 0.5 part of at least one retarder selected from the group consisting of PA, PAc and THPA, all based on 100 parts by weight of rubber (phr).

Examples of rubbers in which the preblend can be used are: natural rubber, EPDMs, cis-polybutadiene, high cis-polyisoprene, rubbery emulsion or solution butadiene-styrene copolymer, nitrile rubbers, acrylic rubbers, isoprene-acrylonitrile rubbers and the like and mixtures of the same. These rubbers can be mixed with the usual compounding ingredients including stearic acid, zinc oxide, magnesium oxide, silica, carbon black, antioxidants, antidegradants and other curatives, rubber compounding ingredients and the like well know to those skilled in the art for the particular rubbers being employed.

These rubbers can be used in the manufacture of carcasses, belts, flippers and chafers of radial, bias, or belted-bias passenger tires, truck tires, motorcycle tires, farm tires, off-the-road tires, and airplane tires, and, also, in making transmission belts, V-belts, conveyor belts, hose, gaskets, tarpaulins, tennis balls, bushings, automotive weatherstrip and the like.

In the following examples the scorch test was determined using a Monsanto Oscillating Disc Rheometer.

| Material | Parts by Weight |
|---|---|
| SBR 1848 (1) | 245 |
| Stearic Acid | 1 |
| Zinc Oxide | 3 |

(1) Styrene-butadiene rubbery copolymer black masterbatch, cold emulsion polymerized at a temperature of 50° F. and below, target bound styrene of 23.5%, fatty acid-rosin acid emulsifier, nominal Mooney viscosity ML1 + 4 at 212° F. of 42–45, acid coagulated, contains 82.5 phr of N-339 carbon black and 62.5 phr of highly aromatic oil.

The sulfur used in the examples was Rubbermakers Sulfur.

EXAMPLE 1

S, CBS, and DPG in a weight ratio of 1.1 to 1.8 to 0.1 phr were preblended, mixed with the foregoing rubber compound and then tested in the Monsanto Rheometer as to scorch. The results are shown in Table I below:

TABLE I

Scorch Time, Minutes, for Preblend of S, CBS and DPG With and Without Additives

| Run No. | Additive (phr) | No Aging | Preblend Aged 24 hours @ 40° C. | |
|---|---|---|---|---|
|  |  |  | Dry | Moist |
| 1 | none (control) | 12.5 | 6 | 5.5 |
| 2 | Phthalic anhydride (0.1) | 12.0 | 12.0 | 12.5 |
| 3 | Phthalic anhydride (0.1) | 13.5 | 12.5 | 12.5 |
| 4 | Phthalic acid (0.11) | 12.0 | 11.3 | 11.5 |
| 5 | Phthalic anhydride (0.1) | 12.5 | 14.5 | 13.5 |
| 6 | PVI (0.1)*** | 12.0 | 6.5 | 6.8 |

***N—(cyclohexylthio)-phthalimide, SANTOGARD PVI, scorch retarder, Monsanto.

Table I shows that phthalic anhydride and phthalic acid effectively stabilized the preblend (powered material). Further, these additives improved preblend flowability after preblend aging. In contrast, PVI and scorch inhibitors like salicylic and benzoic acids, separately each at 0.1 phr in the above preblends, did not stabilize the preblends. This is a surprising result and points out the difference in behavior for retarders in preblends and in rubber compounds.

Retarders like PVI, salicylic acid and benzoic acid are well known scorch retarders and they function with a wide range of sulfur/accelerator systems when incorporated into rubbers. Phthalic anhydride used as a conventional retarder in this manner also delays crosslinking. P. N. Son, "Rubber Chemicals & Technology," 49 118 (1976) suggests that the inhibition of scorch in rubber compounds results from the formation of a phthalic anhydride, zinc oxide and 2-mercaptobenzothiazole complex during cure.

Since there is not any ZnO present in the disclosed curative preblends, another mechanism must be operative. In contrast to the general effectiveness of retarders in sulfur cured rubber, PA and some of its derivatives, e.g., phthalic acid and tetrahydrophthalic anhydride, uniquely stabilize S/CBS/DPG preblends and reduce their tendency to agglomerate during storage. These additives function by inhibiting the reaction between S and CBS in a ternary preblend of S/CBS/DPG or of S and CBS in a binary blend.

EXAMPLE 2

The S/CBS ratio in S/CBS preblends was studied to determine how it affects preblend stability. It was found that PA improved preblend stability over the range of S/CBS examined. The results obtained are shown in Table 2, below:

ment was evident for both dry and moist aging conditions.

The level of PA in an S/CBS blend (1.1/1.8 phr), also, was examined with the results shown in Table 3, below:

TABLE 3

| | | Scorch Time (Min.) After Aging or Exposure Time in Hours (h) at 40° C. | | | | | | | | | |
|---|---|---|---|---|---|---|---|---|---|---|---|
| | | Dry | | | | | Moist | | | | |
| Run No. | PA (phr) | 0 (h) | 6 (h) | 24 (h) | 48 (h) | 72 (h) | 0 (h) | 6 (h) | 24 (h) | 48 (h) | 72 (h) |
| 20 | — | 13.3 | 13.3 | 12.5 | 7.0 | 5.5 | 13.3 | 10.3 | 6.0 | 5.8 | 5.8 |
| 21 | 0.1 | 11.5 | 10.8 | 11.3 | 10.3 | 6.3 | 11.5 | 8.8 | 5.0 | 5.3 | 5.5 |
| 22 | 0.2 | 11.5 | 12.8 | 12.0 | 11.0 | 11.5 | 11.5 | 11.5 | 9.5 | 7.0 | 8.0 |
| 23 | 0.4 | 12.0 | 11.8 | 11.0 | 11.5 | 11.5 | 12.0 | 11.3 | 10.5 | 10.0 | 9.5 |

It is seen that the level of PA in an S/CBS preblend affected the preblend stability with stability increasing as the PA level was increased to 0.4 phr.

The improvement in stability was most pronounced under moist aging conditions. Other additives with a PA-like structure, e.g., tetrahydrophthalic anhydride, also, stabilized scorch behavior of S/CBS preblends.

$t_{90}$, $T_{MAX}$ (Monsanto Rheometer) and other physical properties were determined for the rubber formulations of Runs 10 to 15, 20 and 21. These properties were generally acceptable, especially where $t_2$ did not show a large change from the original value.

I claim:

1. A preblend consisting essentially of by weight:

TABLE 2

| | | | | Scorch Time (Min.) After Aging or Exposure Time in Hours (h) at 40° C. | | | | | | | | |
|---|---|---|---|---|---|---|---|---|---|---|---|---|
| | | | | Dry | | | | | Moist | | | |
| Run No. | S # | CBS # | PA # | 0 (h) | 6 (h) | 24 (h) | 48 (h) | 72 (h) | 0 (h) | 6 (h) | 24 (h) | 48 (h) | 72 (h) |
| 10 | 0.5 | 4.0 | — | 13.3 | 13.3 | 12.5 | 7.0 | 5.5 | 13.3 | 10.3 | 6.0 | 5.8 | 5.8 |
| 11 | 0.5 | 4.0 | 0.1 | 13.5 | 13.3 | 13.0 | 13.0 | 12.8 | 13.5 | 13.0 | 6.0 | 5.5 | 5.3 |
| 12 | 1.1 | 1.8 | — | 11.5 | 10.8 | 11.3 | 10.3 | 6.3 | 11.5 | 8.8 | 5.0 | 5.3 | 5.5 |
| 13 | 1.1 | 1.8 | 0.1 | 12.3 | 11.0 | 12.0 | 12.3 | 12.3 | 12.3 | 12.0 | 11.0 | 5.8 | 6.5 |
| 14 | 2.2 | 0.9 | — | 10.0 | 10.8 | 9.0 | 10.3 | 10.8 | 10.0 | 11.3 | 6.3 | 7.0 | 8.0 |
| 15 | 2.2 | 0.9 | 0.1 | 10.5 | 11.0 | 11.5 | 11.3 | 11.5 | 10.5 | 10.8 | 9.5 | 8.8 | 9.3 | phr

In this series of runs the rubber compound was premixed additionally with 0.1 phr of DPG.

It is noted that the preblends in Table 2 contained only S and CBS.

This table shows that PA improved the scorch stability of S/CBS preblends, over the ratios of S/CBS examined. For the highest S/CBS ratio (2.2/0.9) scorch time decreased but was relatively stable over the 72-hour aging period.

EXAMPLE 3

The aging period over which stability is imparted decreased as the sulfur/CBS ratio decreased. Thus, PA significantly improved the stability of sulfur/CBS preblends over a range of sulfur/CBS ratios. The improve- I. from about 0.5 to 3.0 parts of sulfur,
II. from 0.5 to 5.0 parts of N-cyclohexyl-2-benzothiazolesulfenamide,
III. optionally and additionally, from 0.05 to 1.5 parts of diphenylguanidine, and
IV. from 0.05 to 0.5 part of at least one retarder selected from the group consisting of phthalic anhydride, phthalic acid and tetrahydrophthalic anhydride, all based on 100 parts by weight of rubber.

2. A preblend according to claim 1 where IV. is phthalic anhydride.

3. A preblend according to claim 1 where IV. is phthalic acid.

4. A preblend according to claim 1 where IV. is tetrahydrophthalic anhydride.

* * * * *